UNITED STATES PATENT OFFICE.

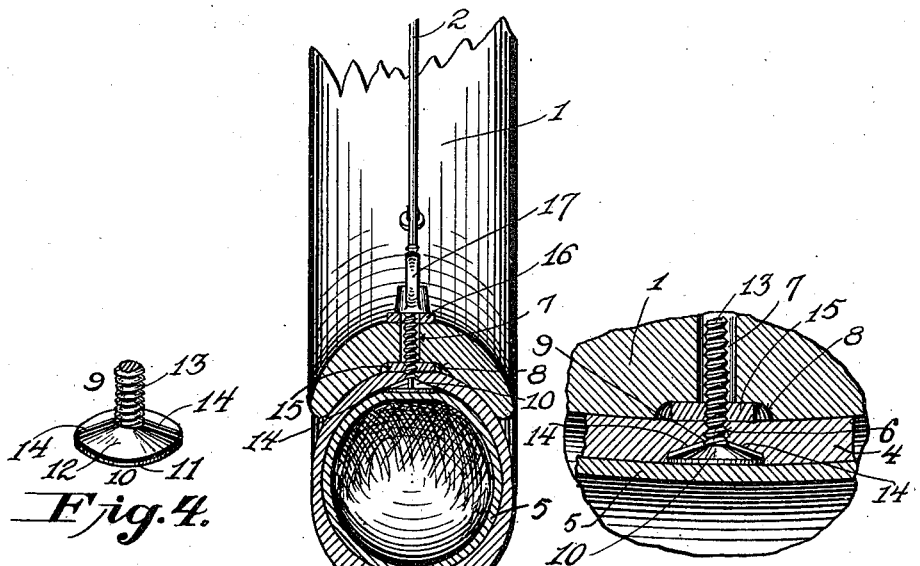
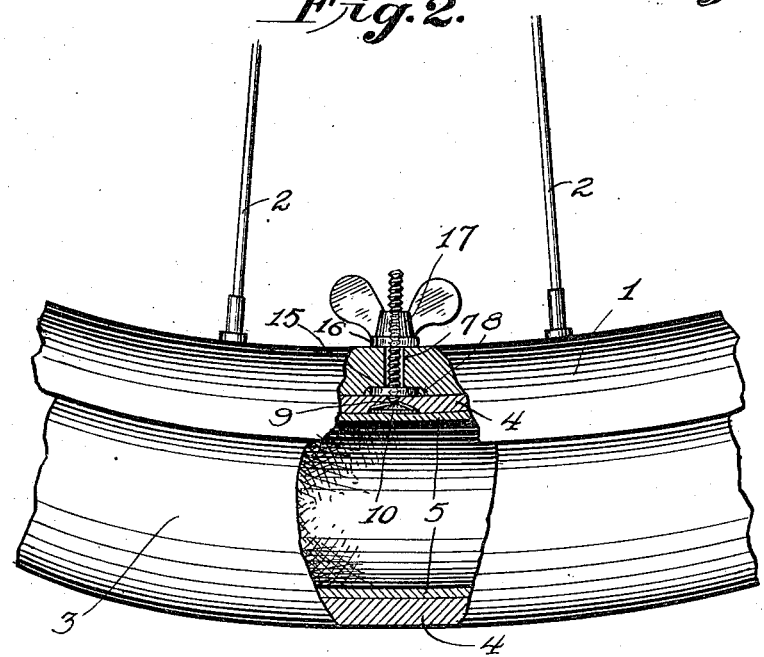

CHARLES R. SPORE, JR., AND JOHN B. LANG, OF MOBERLY, MISSOURI.

TIRE-SECURING DEVICE.

975,901.  Specification of Letters Patent. Patented Nov. 15, 1910.

Application filed November 3, 1909. Serial No. 526,060.

*To all whom it may concern:*

Be it known that we, CHARLES R. SPORE, Jr., and JOHN B. LANG, citizens of the United States of America, residing at Moberly, in the county of Randolph and State of Missouri, have invented certain new and useful Improvements in Tire-Securing Devices, of which the following is a specification, reference being had therein to the accompanying drawing.

Our invention relates to improvements in means for securing tires to fellies of wheels, and is particularly adapted for securing double tube tires, and has for its object to provide means for securing the tires without the use of cement or other adhesives.

Other objects and advantages of our invention will appear in the course of the following specification.

In the accompanying drawings: Figure 1 is a side elevation of a section of a felly and tire, with parts broken away, showing our tire securing means in position. Fig. 2 is a cross sectional view through a felly and tire fitted with our improved tire securing means. Fig. 3 is a fragmentary longitudinal section through a felly and tire fitted with our improved tire securing means. Fig. 4 is a perspective view of the bolt used as the securing means, the end of the shank thereof being broken off.

Referring to the drawings, which illustrate the preferred embodiment of our invention, 1 designates the felly of a vehicle wheel provided with the usual spokes 2. Mounted on the felly 1 is a double tube pneumatic tire 3 comprising an outer tube 4 and an inner tube 5. The outer tube 4 in the center of its upper or inner side is provided with a series of preferably equidistant perforations each designated 6. Centrally of the felly 1 is also a series of equidistant perforations 7, so spaced and arranged as to register with the perforations 6 in the outer tube 4. Each of the perforations 7 at its lower or inner end is provided with a circular concentric socket 8 for a purpose to be hereinafter explained.

Projected through each perforation 6 in the outer tube 4 is a bolt 9 provided with an enlarged circular, flat-topped head 10 having narrow sides or edges 11 from which the bottom 12 of the head is inwardly and slightly upwardly inclined to the shank 13, as shown. The bottom 12 of the head of the bolt is provided with oppositely disposed radial ribs or projections 14, 14, for a purpose to be hereinafter explained.

The shank 13 of the bolt is screw threaded and has threaded thereon an interiorly-threaded, circular nut 15, which is screwed down on the outside of the outer tube pressing the ribs 14, 14, into the inside of the tube, as shown. By this arrangement the bolt is firmly held in position, and the locking nut 15 will prevent the head from being drawn through the outer tube. Further, the top of the head of the bolt being flat, the inner tube 5 will not be injured by it. When the tire 3 is mounted on the felly 1, the shanks 13 of the bolts 9 project through the perforations 7 in the felly, and the locking nuts 15 fit into the sockets 8. A washer 16 is placed over the projecting end of each shank 13 and then a thumb nut 17 is screwed down firmly on each washer, thereby securing the tire in position on the felly. By this arrangement the pressure or traction caused by the thumb nuts 17 is borne entirely by the locking washers 15 instead of the heads 10 of the bolts, consequently removing the strain from the tire.

What we claim is:

In a vehicle wheel, a felly provided with radial perforations and a circular socket at the outer end of each of said perforations in the outer face of the felly, an outer tire provided with perforations which register with the perforations in the felly, each of the perforations in the tire having a recess at one end in the inner surface of the tire, screw-threaded bolts extending through said alining perforations in the felly and tire, each bolt having a flat top head with a tapering under side provided with radial ribs and located in said recess in the tire, a nut mounted on each of said screw-threaded bolts, and located in each of said circular sockets in the felly, a washer on each of said threaded bolts mounted on the inner side of the felly, and a wing nut on each of said threaded bolts clamping said washer.

In testimony whereof we hereunto affix our signatures in presence of two witnesses.

CHARLES R. SPORE, JR.
JOHN B. LANG.

Witnesses:
NELL BALL,
VIRGIE BALL.